US012758955B2

(12) United States Patent
Gotthardt et al.

(10) Patent No.: US 12,758,955 B2
(45) **Date of Patent: *Oct. 13, 2026**

(54) PARTICLE FILTER FOR EXHAUST GAS OF GASOLINE ENGINES

(71) Applicant: UMICORE AG & CO. KG, Hanau-Wolfgang (DE)

(72) Inventors: Meike Antonia Gotthardt, Frankfurt (DE); Jan Schoenhaber, Darmstadt (DE); Naina Deibel, Pfungstadt (DE); Gabriela Kucerova, Senden (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 487 days.

This patent is subject to a terminal disclaimer.

(21) Appl. No.: 18/549,506

(22) PCT Filed: Mar. 22, 2022

(86) PCT No.: PCT/EP2022/057418
§ 371 (c)(1),
(2) Date: Sep. 7, 2023

(87) PCT Pub. No.: WO2022/200307
PCT Pub. Date: Sep. 29, 2022

(65) Prior Publication Data

US 2024/0149257 A1 May 9, 2024

(30) Foreign Application Priority Data

Mar. 23, 2021 (DE) ........................ 102021107129.1

(51) Int. Cl.
*B01J 35/00* (2024.01)
*B01D 53/94* (2006.01)
(Continued)

(52) U.S. Cl.
CPC .......... *B01J 35/19* (2024.01); *B01D 53/9454* (2013.01); *B01J 23/002* (2013.01); *B01J 23/63* (2013.01);
(Continued)

(58) Field of Classification Search
None
See application file for complete search history.

(56) References Cited

U.S. PATENT DOCUMENTS 6,709,644 B2 3/2004 Zones et al.
7,094,728 B2 8/2006 Yan et al.
(Continued)

FOREIGN PATENT DOCUMENTS

DE 10 2015 212788 A1 1/2017
DE 102018108346 A1 10/2019
(Continued)

OTHER PUBLICATIONS

International Search Report dated Jun. 24, 2022 for International Patent Application No. PCT/EP2022/057418 (4 pages in German with English translation).
(Continued)

*Primary Examiner* — John J Figueroa
(74) *Attorney, Agent, or Firm* — Smith, Gambrell & Russell, LLP

(57) ABSTRACT

The present invention is directed to a wall-flow filter which is used in particular in exhaust gas systems of vehicles driven by gasoline engines. The filter has three-way activity and filters fine particles, which result from the combustion of gasoline, from the exhaust gas stream. The invention also relates to a method for producing a corresponding filter and to the preferred use thereof.

11 Claims, 7 Drawing Sheets

(51) Int. Cl.

| | |
|---|---|
| ***B01J 23/00*** | (2006.01) |
| ***B01J 23/63*** | (2006.01) |
| ***B01J 35/56*** | (2024.01) |
| ***B01J 37/02*** | (2006.01) |
| ***B01J 37/08*** | (2006.01) |
| ***F01N 3/022*** | (2006.01) |
| ***F01N 3/20*** | (2006.01) |
| ***F01N 3/28*** | (2006.01) |

(52) U.S. Cl.

CPC ......... *B01J 37/0228* (2013.01); *B01J 37/088* (2013.01); *F01N 3/0222* (2013.01); *F01N 3/2066* (2013.01); *F01N 3/2803* (2013.01); *B01D 2255/1023* (2013.01); *B01D 2255/1025* (2013.01); *B01D 2255/2061* (2013.01); *B01D 2255/2063* (2013.01); *B01D 2255/2066* (2013.01); *B01D 2255/407* (2013.01); *B01D 2255/9037* (2013.01); *B01D 2255/908* (2013.01); *B01D 2255/9155* (2013.01); *B01D 2258/014* (2013.01); *B01J 35/56* (2024.01); *B01J 2523/36* (2013.01); *B01J 2523/3706* (2013.01); *B01J 2523/3712* (2013.01); *B01J 2523/3718* (2013.01); *B01J 2523/48* (2013.01); *F01N 2510/063* (2013.01); *F01N 2510/0682* (2013.01)

(56) References Cited

U.S. PATENT DOCUMENTS

| | | | | |
|---|---|---|---|---|
| 8,277,880 | B2 | 10/2012 | Sato et al. | |
| 8,388,721 | B2 | 3/2013 | Ishizawa | |
| 8,394,348 | B1 | 3/2013 | Nunan et al. | |
| 8,431,186 | B2 | 4/2013 | Jeske et al. | |
| 8,557,204 | B2 | 10/2013 | Nunan et al. | |
| 8,617,474 | B2 | 12/2013 | Bull et al. | |
| 8,794,178 | B2 | 8/2014 | Mergner et al. | |
| 9,551,253 | B2 | 1/2017 | Fehnle et al. | |
| 10,183,287 | B1 | 1/2019 | Kraus et al. | |
| 11,135,571 | B2 | 10/2021 | Quinet et al. | |
| 11,305,269 | B2 * | 4/2022 | Deibel ................. | B01D 53/945 |
| 11,441,459 | B2 | 9/2022 | Deibel et al. | |
| 11,566,548 | B2 | 1/2023 | Foerster et al. | |
| 11,679,359 | B2 | 6/2023 | Mueller et al. | |
| 11,702,971 | B2 | 7/2023 | Schoenhaber et al. | |
| 12,270,326 | B2 * | 4/2025 | Colombo ............. | B01J 37/0232 |
| 2008/0107806 | A1 | 5/2008 | Mergner et al. | |
| 2010/0239478 | A1 * | 9/2010 | Arnold ................... | B01J 29/088 423/213.2 |
| 2013/0149440 | A1 * | 6/2013 | Pyzik ...................... | C04B 41/85 427/140 |
| 2013/0205743 | A1 | 8/2013 | Sobolevskiy | |
| 2014/0140899 | A1 * | 5/2014 | Gabrielsson ............. | B05D 1/18 422/171 |
| 2014/0170033 | A1 * | 6/2014 | Gabrielsson .......... | F01N 3/2832 427/244 |
| 2019/0262757 | A1 * | 8/2019 | Car .................... | B01D 53/9418 |
| 2020/0182115 | A1 | 6/2020 | Cravillon et al. | |
| 2021/0046467 | A1 | 2/2021 | Bellham et al. | |
| 2021/0236976 | A1 | 8/2021 | Foerster et al. | |
| 2021/0396167 | A1 * | 12/2021 | Foerster ................ | C04B 35/195 |
| 2022/0325645 | A1 | 10/2022 | Gensch et al. | |
| 2024/0159175 | A1 * | 5/2024 | Schoenhaber ........ | F01N 3/0222 |

FOREIGN PATENT DOCUMENTS

| | | | | |
|---|---|---|---|---|
| DE | 102018127953 | A1 | 5/2020 | |
| DE | 102018127955 | A1 | 5/2020 | |
| DE | 10 2019 100099 | A1 | 7/2020 | |
| EP | 0 345 695 | A2 | 12/1989 | |
| EP | 0 385 164 | A2 | 9/1990 | |
| EP | 1 486 248 | A1 | 12/2004 | |
| EP | 2 502 661 | A2 | 9/2012 | |
| EP | 2 727 640 | A1 | 5/2014 | |
| EP | 2 502 662 | B1 | 6/2014 | |
| EP | 2 650 042 | B1 | 11/2014 | |
| EP | 2 576 021 | B1 | 12/2014 | |
| EP | 3 078 821 | A1 | 10/2016 | |
| EP | 1 789 190 | B1 | 6/2017 | |
| EP | 3 501 646 | A1 | 6/2019 | |
| JP | H01-151706 | A | 6/1989 | |
| WO | 89/03366 | A1 | 4/1989 | |
| WO | 01/10573 | A2 | 2/2001 | |
| WO | 2005/016497 | A1 | 2/2005 | |
| WO | 2006/021338 | A1 | 3/2006 | |
| WO | 2006/021339 | A1 | 3/2006 | |
| WO | 2006/042699 | A1 | 4/2006 | |
| WO | 2008/106519 | A1 | 9/2008 | |
| WO | 2008/118434 | A1 | 10/2008 | |
| WO | 2008/132452 | A2 | 11/2008 | |
| WO | 2009/087998 | A1 | 7/2009 | |
| WO | 2009/103699 | A1 | 8/2009 | |
| WO | 2011/013006 | A2 | 2/2011 | |
| WO | 2011/098450 | A1 | 8/2011 | |
| WO | 2011/127505 | A1 | 10/2011 | |
| WO | 2011/151711 | A1 | 12/2011 | |
| WO | 2012/030533 | A1 | 3/2012 | |
| WO | 2012/030534 | A1 | 3/2012 | |
| WO | WO-2013007466 | A1 * | 1/2013 | ........... F01N 3/2832 |
| WO | 2013/070519 | A1 | 5/2013 | |
| WO | 2015/145122 | A2 | 10/2015 | |
| WO | 2017/101449 | A1 | 6/2017 | |
| WO | 2018/018406 | A1 | 2/2018 | |
| WO | 2019/008078 | A1 | 1/2019 | |
| WO | 2019/096785 | A1 | 5/2019 | |
| WO | 2019/197177 | A1 | 10/2019 | |
| WO | 2019/211373 | A1 | 11/2019 | |
| WO | 2019/215208 | A1 | 11/2019 | |
| WO | 2020/039650 | A1 | 2/2020 | |
| WO | 2020/094760 | A1 | 5/2020 | |
| WO | 2020/094763 | A1 | 5/2020 | |

OTHER PUBLICATIONS

Written Opinion of the International Searching Authority dated Jun. 24, 2022 for International Patent Application No. PCT/EP2022/057418 (6 pages in German).

DIN 66132: Bestimmung der spezifischen Oberfläche von Feststoffen durch Stickstoffadsorption; Einpunkt-Differenzverfahren nach Haul und Dümbgen. [Determination of specific surface area of solids by adsorption of nitrogen; single-point differential method according to Haul and Dümbgen.] Standard by Deutsches Institut Fur Normung E.V. [German National Standard], 1975. 5 pages in German with English machine translation.

Blazek, M. et al. Washcoating of catalytic particulate filters studied by time-resolved X-ray tomography. Chemical Engineering Journal. 2021. vol. 409, No. 128057 (14 pages).

Greiner, R. et al. Tomography based simulation of reactive flow at the micro-scale: Particulate filters with wall integrated catalyst. Chemical Engineering Journal. 2019. vol. 378, No. 121919 (12 pages).

Von Johann Siebler, et al. MTZ Motortechnische Zeitschrift [Katalysatorprüfung] (Motor Technical Journal [Catalyst Test]) 1994, 55, pp. 214-218.

English translation of the Written Opinion of the International Searching Authority dated Jun. 24, 2022 for International Patent Application No. PCT/EP2022/057418 (6 pages).

International Preliminary Report on Patentability dated Sep. 12, 2023 for International Patent Application No. PCT/EP2022/057418 (7 pages English translation; 7 pages in German).

DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).

DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determi-

(56) References Cited

OTHER PUBLICATIONS nation of the pore size distribution and the specific surface mesoporous solids by nitrogen sorption Procedure according to Barrett, Joyner and Halenda (BJH)] (7 pages in German with machine translation).
Aerosolgeneratoren Und—Dispergierer. accessed May 7, 2018. http://www.tsi.com/Aerosolgeneratoren-und-dispergierer/ (3 pages in German with English translation).
Aerosolgernatoren fur Feststoffe. Accessed May 7, 2018. https://www.palas.de/de/product/aerosolgeneratorssolidparticles (2 pages in German with English translation).
Non Final Office Action mailed Jun. 6, 2024 for U.S. Appl. No. 18/547,856 (15 pages).
Final Office Action mailed Sep. 4, 2024 for U.S. Appl. No. 18/547,856 (19 pages).
Notice of Allowance and Fees Due mailed Dec. 17, 2024 for U.S. Appl. No. 18/547,856 (9 pages).

* cited by examiner

PARTICLE FILTER FOR EXHAUST GAS OF GASOLINE ENGINES

The present invention is directed to a wall-flow filter which is used in particular in exhaust gas systems of vehicles driven by gasoline engines. The filter has improved three-way activity and filters fine particles, which result from the combustion of gasoline, from the exhaust gas stream. The invention also relates to a method for producing a corresponding filter and to the preferred use thereof.

The exhaust gas of, for example, internal combustion engines typically contains the harmful gases carbon monoxide (CO) and hydrocarbons (HC), nitrogen oxides ($NO_x$) and possibly sulfur oxides (SOX), as well as particulates that mostly consist of soot residues and possibly adherent organic agglomerates. These are called primary emissions. CO, HC, and particulates are products of the incomplete combustion of the fuel inside the combustion chamber of the engine. Nitrogen oxides form in the cylinder from nitrogen and oxygen in the intake air when the combustion temperatures locally exceed 1400° C. Sulfur oxides result from the combustion of organic sulfur compounds, small amounts of which are always present in non-synthetic fuels. For the removal of these emissions, which are harmful to health and environment, from the exhaust gases of motor vehicles, a variety of catalytic technologies for the purification of exhaust gases have been developed, the fundamental principle of which is usually based upon guiding the exhaust gas that needs purification through a catalyst consisting of a flow-through or wall-flow honeycomb-like body (wall-flow filter) and a catalytically active coating applied to and/or in it. The catalyst promotes the chemical reaction of various exhaust gas components to form non-hazardous products such as carbon dioxide and water, and at the same time removes soot particles in the case of a wall-flow filter.

Particles may be very effectively removed from the exhaust gas with the aid of particle filters. Wall flow filters made of ceramic materials have proved particularly successful. These have two end faces and are constructed from a plurality of parallel channels of a certain length, which are formed by porous walls and which extend from one end face to the other. The channels are closed alternately at one end of the filter so that first channels are formed, which are open at the first side of the filter and closed at the second side of the filter, along with second channels, which are closed at the first side of the filter and open at the second side of the filter. In accordance with the arrangement of the filter in the exhaust gas flow, one of the end surfaces here forms the inlet end surface and the second end surface forms the outlet end surface for the exhaust gas. The flow channels that are open at the inlet side form the inlet channels, and the flow channels that are open at the outlet side form the outlet channels. The exhaust gas flowing into the first channels, for example, may leave the filter again only via the second channels and must flow through the walls between the first and second channels for this purpose. For this reason, the material from which the wall-flow filters are constructed exhibits an open-pored porosity. The particles are retained when the exhaust gas passes through the wall.

Wall flow filters may be catalytically active. The catalytic activity is achieved by coating the filter with a coating suspension which contains the catalytically active material. The contacting of the catalytically active materials with the wall-flow filter is referred to in the art as "coating." The coating takes on the actual catalytic function and frequently includes storage materials and/or catalytically active metals that are for the most part deposited in a highly dispersed form onto temperature-stable metal compounds, in particular oxides, with a large surface area. The coating for the most part takes place via the application of an aqueous suspension of the storage materials and catalytically active components—also called a washcoat—onto or into the wall of the wall flow filter. After the application of the suspension, the support is usually dried and, if applicable, calcined at increased temperature. The coating may consist of one layer or be made up of multiple layers that are applied atop one another (multi-layered) and/or offset relative to one another (as zones) onto a corresponding filter. The catalytically active material can be applied to the porous walls between the channels (what is known as on-wall coating). However, this coating can lead to a significant increase in the back pressure of the filter. With this as the background, JPH01-151706 and WO2005016497A1, for example, propose to coat a wall-flow filter with a catalyst such that the latter penetrates through the porous walls (what is known as in-wall coating). A coating zone is understood to mean the presence of a catalytically active material (coating) on or in the wall of the filter over less than the entire length of the wall-flow filter. In the present case, when referring to the length of the wall-flow filter, the entire length is meant, including the plugs that form the closure of the channels.

So-called three-way catalysts are used for exhaust gas reduction for stoichiometrically burning engines. Three-way catalysts (TWCs) have long been known to those skilled in the art and have been legally prescribed since the eighties in the last century. The actual catalyst mass here consists for the most part of large-surface-area metal compounds, in particular oxidic carrier materials, on which the catalytically active components are deposited with the finest distribution. The precious metals of the platinum group, platinum, palladium and/or rhodium are particularly suitable as catalytically active components for cleaning stoichiometrically composed exhaust gases. For example, aluminum oxide, silicon dioxide, titanium oxide, zirconium oxide, cerium oxide and their mixed oxides, and zeolites are suitable as carrier materials. What are known as active aluminum oxides having a specific surface area (BET surface area, measured according to DIN 66132—the latest version at the time of filing) of more than 10 $m^2/g$ are preferably used. Moreover, three-way catalysts include oxygen-storing components to improve the dynamic conversion. These include cerium/zirconium mixed oxides which are optionally provided with lanthanum oxide, praseodymium oxide and/or yttrium oxide. Meanwhile, zoned and multi-layer systems having three-way activity have also become known (U.S. Pat. Nos. 8,557,204; 8,394,348). If such a three-way catalyst is located on or in a particle filter, this is referred to as a cGPF (catalyzed gasoline particle filter; for example EP2650042B1).

The quality of a catalytically coated exhaust filter is measured according to the criteria of filtration efficiency, catalytic performance and pressure loss. In order to meet these different requirements, filters are provided, for example, with catalytically active zones. As stated, the zones may be present on the walls of the cells or in the porous wall of the filter matrix.

A group of coating techniques for wall-flow filters is described in WO06021338A1. Here, the wall-flow filter is made of an open-pore material, has a cylindrical shape having the length L and is traversed from an inlet end surface to an outlet end surface by a plurality of flow channels that are alternately closed. The coating suspension can be applied by perpendicularly orienting the flow channels of the wall-flow filter such that one end face is located at the bottom and the second end face at the top, by introducing the coating composition into the filter body through the flow channels of the wall-flow filter that are open in the lower end face to a desired height above the lower end face by applying a pressure difference and removing excess coating composition downward by applying a suction pulse. The special modifications of the method in WO 06042699A1 and WO 11098450A1 are based on the same coating principle. A coating apparatus using this method principle is presented in WO 13070519A1. Here, too, an excess of coating suspension and the principle of applying the pressure difference reversal are used.

This coating principle is also suitable for producing particle filters which have zones with catalytically active material on the inlet and outlet sides. In WO 09103699A1, a method for coating filters with two different washcoats is described, the method steps being that the filter substrate is oriented vertically, a first coating suspension is pumped from below (pressure difference with highest pressure at the lower end), the excess coating suspension removed through suction (pressure difference reversal) and the filter body is filled again from below with the second washcoat after rotation by 180°, and the excess is removed by suction. The filter is dried and calcined after the coating process.

The same coating principle is disclosed in U.S. Pat. No. 7,094,728B2. Coated wall-flow filters produced in this manner frequently have a gradient in the coating, as is schematically shown and exaggerated in FIG. 1.

The methods described in WO 06021339A1, WO 15145122A2 and WO 0110573A2, for example, belong to the second group of coating methods, in which the filter bodies are coated without excess washcoat and without pressure difference reversal. In this case, the perpendicularly oriented filter carrier can be coated with the washcoat from the lower or the upper end face.

WO06021339A1, discloses a method for coating a wall flow particle filter with a coating composition, wherein the particle filter is made of an open-pored material, has a cylindrical shape with length L, and has a plurality of flow channels from an inlet end surface to an outlet end surface, said channels being closed off in alternating fashion. The method is characterized in that the flow channels of the wall-flow filter are oriented perpendicularly so that one end face comes to lie at the bottom and the second end face comes to lie at the top, the filter is filled by dipping the lower end face of the wall-flow filter into a defined, specified amount of the coating composition and applying a negative pressure to the openings in the outlet channels in the upper end face and sucking the entire amount of the coating composition into the inlet and outlet channels through the openings in the inlet channels in the lower end face. The amount of coating composition presented is selected according to the desired coating concentration and coating height. There is no pressure difference reversal after the application of the pressure difference for coating. The coating suspension is measured and not used in excess.

WO 0110573A2 also describes a method for coating particle filters in which a measured amount of washcoat is applied from below to the filter carrier. By applying a pressure difference (vacuum at the upwardly directed end face), the charged amount of coating suspension is sucked into the channels of the substrate. The substrate is then rotated and the washcoat is distributed in the channels by the action of a jet of pressurized air onto the upper end of the substrate. In this method, the pressure difference does not reverse because the second pressure pulse is also in the same direction as the first one with respect to the movement of the washcoat, so there is no pressure difference reversal.

WO 15145122A2 is another example of this group of coating methods. In contrast to the methods described above, however, here a predefined amount of coating suspension is applied as measured to the upper end face of the vertically oriented filter and is distributed in the channels of the particle filter by applying a pressure difference (suctioning by applying a vacuum to the lower end face). No further pressure difference reversal takes place after this coating step.

The object of the present invention is to provide a wall-flow filter that improves its catalytic activity and is not substantially inferior to the gasoline particle filters (GPF, OPF) of the prior art with respect to filtration efficiency and exhaust gas back pressure. The desired filter should have a correspondingly high filtration efficiency, in particular in the case of high catalytic activity, if the exhaust gas back pressure is not excessively impaired.

These and other aims evident from prior art are achieved by a wall-flow filter having the features of claim 1. Claims 7 and 10 are directed to a method for manufacturing or using the wall-flow filter according to the invention. The claims dependent on these claims relate to preferred embodiments of the respective independent claims.

The aforementioned object is surprisingly achieved by providing a wall-flow filter for reducing particle emissions in the exhaust gas of gasoline engines having the length L, wherein the wall-flow filter comprises channels E and A that extend in parallel between a first and a second end of the wall-flow filter and are separated by porous walls forming surfaces OE or OA, respectively, and wherein the channels E are closed at the second end and the channels A are closed at the first end, and said wall-flow filter has two catalytically active coatings applied to the surfaces OE and OA in separate coating steps, wherein a first coating extends from the first end of the wall-flow filter over 55 to 96% of the length L and a second coating extends from the first end of the wall-flow filter over 10 to 40% of the length L and wherein a third coating extends from the second end of the wall-flow filter over 55 to 96% of the length L and a fourth coating extends from the second end of the wall-flow filter over 10 to 40% of the length L. The wall-flow filters propagated here (FIG. 2*a-d*) have a better catalytic activity (FIG. 3) than a wall-flow filter of the prior art having the same load, wherein the latter was coated with an excess of coating suspension from both sides and the excess of coating suspension was removed in each case by a pressure difference reversal (FIG. 1). It is also surprising that the filter according to the invention generates only a low exhaust gas back pressure (FIG. 4) and is in no way inferior to the filters of the prior art (FIG. 1) in terms of filtration efficiency (FIG. 5). The first through fourth coatings are numbered 1-4 below.

According to the invention, the individual zones of the catalytic coating of the wall-flow filter are in each case positioned on the wall of the input surface OE and the output surface OA from the corresponding open ends of the channels toward the other end. The term "on the wall" means that one of the catalytically active coatings penetrates into the porous wall surface of the input or output channels only to a small extent of not more than 33%, more preferably less than 15% and most preferably less than 10%, based on the total amount of this catalytically active coating. Corresponding analyses can be performed by means of CT images or SEM images of sections through the filter wall and image analysis methods (Blazek et al., Chem. Eng. J. 409 (2021) 128057; Greiner et al., Chem. Eng. J. 378 (2019) 121919).

The formation of the individual zones can be varied by a person skilled in the art within the limits given above. He will be guided by the criteria for the quality of a wall-flow filter mentioned at the outset. It is important that the longer zones (1st and 3rd coating) of the catalytic coating overlap at least a small portion of the length L, while the short zones (2nd and 4th zone) do not. In a preferred embodiment, a first coating therefore extends from the first end of the wall-flow filter over 55 to 80% of the length L and a second coating extends from the first end of the wall-flow filter over 20 to 40% of the length L, wherein a third coating extends from the second end of the wall-flow filter over 55 to 80% of the length L and a fourth coating extends from the second end of the wall-flow filter over to 40% of the length L. It is more preferred if a first coating extends from the first end of the wall-flow filter over 55 to 70% of the length L and a second coating extends from the first end of the wall-flow filter over 25 to 35% of the length L and a third coating extends from the second end of the wall-flow filter over 55 to 70% of the length L and a fourth coating extends from the second end of the wall-flow filter over 25 to 35% of the length L. The filters mentioned by way of example in this document had zones of 60% of the length L for the long zones and 30% of the length L for the short zones.

It has proven advantageous for both the long and the short zones to have a corresponding catalytic activity. The catalytic activity of a coating is also determined by the amount of coating. The amount of coating in g/l on the filter can be varied by a person skilled in the art. It has proven to be particularly advantageous if the ratio of the amount of catalytically active coating in g/l between the first coating and the second coating or between the third and the fourth coating is less than or equal to 1:1 and greater than or equal to 1:3. This means that the short zones are preferably applied to the filter in a higher concentration than the long zones. The ratio of the coating concentrations is very particularly preferably 1:2 to 1:3 (measured in g/l). However, this specification applies in particular in the case that the coatings on the surfaces OE (input) and OA (output) correspond in terms of layout and construction. In an embodiment according to the invention, it is very particularly preferred if the coatings on the surfaces OE and OA are different in each case. In a further embodiment according to the invention, it is very particularly preferred if the coatings on the surfaces OE and OA are the same in each case. All four coatings according to the invention can also be the same. It is also possible for the same coatings on the surface OE to be different from the same coatings on the surface OA.

Same means that both the chemical composition and the amount and extent of the coatings are the same. However, as just described, it is also possible that the four coating zones discussed can be designed differently, both chemically, quantitatively and/or in length, depending on the requirement profile. It should be mentioned that further coatings can also be present in and on the filter according to the invention. For example, additionally coating the inner wall of the channels with a corresponding catalytically active composition is conceivable. This would help to further increase the catalytic activity of the wall-flow filter described herein. However, combinations having an optionally non-catalytically active powder coating in and/or on the input side of the wall-flow filter are also conceivable. This would help to further increase filtration efficiency without enormously increasing the exhaust gas back pressure.

The sequence of application of the individual coating zones can also be configured differently. It has been found that, in particular in the case of the same coatings on the input and output sides of the filter, an embodiment of the present invention in which the short zones are applied last and the long zones are applied first is preferred. Accordingly, it is particularly advantageous if first the first coating and the third coating are applied to the wall-flow filter before the second and the fourth coating are applied (FIGS. 2*c* and 2*d*).

The coatings are three-way catalytically active, especially at operating temperatures of 250 to 1100° C. They usually contain one or more precious metals fixed to one or more carrier materials, and one or more oxygen storage components. The coatings preferably comprise the same oxygen storage components and the same carrier materials for precious metals in different but preferably in equal amounts. The coatings also contain the same or different precious metals in the same or different amounts. Particularly preferably, in each case coatings one and two and coatings three and four are chemically completely identical. It has been found advantageous for the production of wall-flow filters if at least the coatings 1 and 3 are chemically identical and coatings 2 and 4 are chemically identical but different from coatings 1 and 3. The difference may preferably lie in the type of precious metals used and/or in the type of oxygen storage materials used. For example, either coatings 1 and 3 can preferably comprise platinum, palladium or mixtures thereof, and coatings 2 and 4 can preferably comprise platinum, palladium, rhodium, or mixtures thereof. Furthermore, coatings 2 and 4 can have an oxygen storage material, while coatings 1 and 3 have two oxygen storage materials. Such architectures have been shown to be particularly robust in aging tests.

Platinum, palladium and rhodium are particularly suitable as precious metals for the above coatings, wherein palladium, rhodium or platinum, palladium and rhodium are preferred and palladium and rhodium are particularly preferred. Based on the particle filter according to the invention, the proportion of rhodium in the entire precious metal content is in particular greater than or equal to 5% by weight but less than or equal to 50% by weight, preferably less than 30% by weight. The porous walls of the particle filter according to the invention are preferably substantially free of precious metals. The precious metals are usually used in amounts of 0.15 to 5 g/l, more preferably 0.3 to 4 g/l, based on the volume of the wall-flow filter.

As carrier materials for the precious metals, all materials familiar to the person skilled in the art for this purpose can be considered. Such materials are in particular metal oxides with a BET surface area of 30 to 250 $m^2/g$, preferably 100 to 200 $m^2/g$ (determined according to DIN 66132). Particularly suitable carrier materials for the noble metals are selected from the series consisting of alumina, doped alumina, silicon oxide, titanium dioxide and mixed oxides of one or more thereof. Doped aluminum oxides are, for example, aluminum oxides doped with lanthanum oxide, silicon oxide, zirconium oxide and/or titanium oxide. Lanthanum-stabilized aluminum oxide is advantageously used, wherein further advantageously lanthanum is preferably used in amounts of 1 to 10% by weight, preferably 3 to 6% by weight, in each case calculated as $La_2O_3$ and based on the weight of the stabilized aluminum oxide. Another suitable carrier material is lanthanum-stabilized aluminum oxide the surface of which is coated with lanthanum oxide, with barium oxide or with strontium oxide. In a particularly preferred embodiment, at least one of the coatings 1-4 contains stabilized aluminum oxide in an amount from 20 to 70% by weight based on the total weight of the coating, rhodium, palladium or palladium and rhodium and one or more oxygen storage components in an amount from 30 to 80% by weight based on the total weight of the coating. This is very preferably true for all coatings 1-4.

Cerium/zirconium/rare earth metal mixed oxides are particularly suitable as the oxygen storage component. The term "cerium-zirconium-rare-earth metal mixed oxide" within the meaning of the present invention excludes physical mixtures of cerium oxide, zirconium oxide, and rare earth oxide. Rather, "cerium/zirconium/rare earth metal mixed oxides" are characterized by a largely homogeneous, three-dimensional crystal structure that is ideally free of phases of pure cerium oxide, zirconium oxide or rare earth oxide. Depending on the manufacturing process, however, not completely homogeneous products may arise which can generally be used without any disadvantage. In all other respects, the term "rare earth metal" or "rare earth metal oxide" within the meaning of the present invention does not include cerium or cerium oxide.

Lanthanum oxide, yttrium oxide, praseodymium oxide, neodymium oxide and/or samarium oxide can, for example, be considered as rare earth metal oxides in the cerium-zirconium-rare earth metal mixed oxides. Lanthanum oxide, yttrium oxide and/or praseodymium oxide are preferred. Lanthanum oxide and/or yttrium oxide are particularly preferred, and combinations of lanthanum oxide and yttrium oxide, yttrium oxide and praseodymium oxide, and lanthanum oxide and praseodymium oxide are more particularly preferred. In embodiments of the present invention, the oxygen storage components are particularly preferably free from neodymium oxide.

In preferred embodiments of the present invention, one or all of the coatings contain an alkaline earth compound, such as strontium oxide, barium oxide or barium sulfate. The amount of barium sulfate per coating is, in particular, 2 to 20 g/l, preferably 3 to 10 g/l volume of the wall-flow filter. Coating 1 and/or 3 contains, in particular, strontium oxide or barium oxide.

In further advantageous embodiments of the present invention, one or all of the coatings contain additives, such as rare-earth compounds, such as lanthanum oxide, and/or binders, such as aluminum compounds. These additives are used in quantities that may vary within wide limits and that the person skilled in the art can determine by simple means in the specific case. These help improve the rheology of the coating, if necessary.

In embodiments of the present invention, at least one of, preferably each of the coatings 1-4 comprises lanthanum-stabilized aluminum oxide, palladium, rhodium or palladium and rhodium and an oxygen storage component comprising zirconium oxide, cerium oxide, lanthanum oxide, and yttrium oxide and/or praseodymium oxide. If present, the yttrium oxide content in the coating is in particular 2 to 15% by weight, preferably 3 to 10% by weight, based on the weight of the oxygen storage component. The lanthanum oxide to yttrium oxide weight ratio is in particular 0.1 to 1, preferably 0.3 to 1. If present, the praseodymium oxide content is in particular 2 to 15% by weight, preferably 3 to 10% by weight, based on the weight of the oxygen storage component. The lanthanum oxide to praseodymium oxide weight ratio is in particular 0.1 to 1, preferably 0.3 to 1. One of the coatings 1-4 in particular may comprise an additional oxygen storage component which contains zirconium oxide, cerium oxide, lanthanum oxide, and yttrium oxide and/or praseodymium oxide. This is preferably true for all coatings 1-4.

In embodiments, at least one of the coatings 1-4 each preferably comprises lanthanum-stabilized aluminum oxide in amounts from 35 to 60% by weight, particularly preferably 40 to 60% by weight, and an oxygen storage component in amounts from 40 to 50% by weight, particularly preferably 45 to 50% by weight, in each case based on the total weight of the respective coating. In embodiments, at least one of the coatings 1-4 each comprises lanthanum-stabilized aluminum oxide in amounts from 30 to 50% by weight, particularly preferably 40 to 50% by weight, and an oxygen storage component in amounts from 50 to 80% by weight, particularly preferably 55 to 80% by weight, in each case based on the total weight of the respective coating. In advantageous embodiments of the present invention, in at least one of the coatings 1-4, the weight ratio of aluminum oxide to oxygen storage component is at least 0.7 to at most 1.5, preferably 0.8 to 1.2. In advantageous embodiments of the present invention, in at least one of the coatings 1-4, the weight ratio of aluminum oxide to oxygen storage component is at least 0.3 to at most 0.8, preferably 0.4 to 0.6. The embodiments mentioned here preferably apply to all coatings 1-4.

The present invention also provides a method for producing a wall-flow filter according to the invention, which has the following steps:

i) a first coating suspension is introduced in excess via the first end by applying a pressure difference into the wall-flow filter via the vertically locked wall-flow filter, and a pressure difference reversal removes an excess of the first coating suspension from the wall-flow filter;
ii) a third coating suspension is introduced in excess via the second end by applying a pressure difference into the wall-flow filter via the vertically locked wall-flow filter, and a pressure difference reversal removes an excess of the third coating suspension from the wall-flow filter;
iii) a second coating suspension is introduced into the wall-flow filter via the first end by applying a pressure difference across the vertically locked wall-flow filter;
iv) a fourth coating suspension is introduced into the wall-flow filter via the second end by applying a pressure difference across the vertically locked wall-flow filter.

The sequence of steps i)-iv) is not decisive in a first approximation. It is important to note that in steps i) and ii) a pressure difference reversal takes place in which excess coating suspension is removed from the wall-flow filter. Between steps i) and ii) and between steps iii) and iv), the filter is rotated by 180° in the lock in each case. Rotation can preferably be omitted if the coatings according to i) and iii) are applied from the first side of the filter first and then the coatings according to ii) and iv) are applied from the second side of the filter. It should be noted that coating steps iii) and/or iv) can likewise be carried out like steps i) or ii) with pressure difference reversal and an excess of coating suspension. In a further preferred embodiment, the coating suspensions in steps iii) and iv) are introduced into the wall-flow filter without an excess of coating suspension. In this case, as mentioned at the outset, the coating suspension is first provided and subsequently completely sucked and/or pressed into the filter.

Further intermediate steps of the coating process can take place between steps i)-iv). For example, an intermediate drying or calcination or rotation of the substrate can be carried out within the scope of the invention, provided that the inventive success is not excessively impaired. It should also be mentioned that the coating can be carried out with in each case identical or in each case different catalytically active materials with and without intermediate drying. In a preferred embodiment of the present invention, it is therefore conceivable that a first coating suspension is introduced in excess into a vertically locked wall-flow filter via the first end face by applying a pressure difference across the wall-flow filter, and an excess of the first coating suspension is subsequently removed from the wall-flow filter by a pressure difference reversal (step i)). The pressure difference reversal thereby removes the excess coating suspension from the channels of the wall-flow filter against the coating direction. Then, a second coating suspension without excess is introduced into the wall-flow filter via the first end face by applying a pressure difference across the wall-flow filter (step iii)). Separate drying preferably takes place only after the introduction of the second coating suspension. However, it is also preferably possible for separate intermediate drying to take place in a furnace before the introduction of the second coating suspension. The same is then done with the third and the fourth coating. However, an embodiment is particularly preferred in which there is no separate drying in a furnace between the coating steps. In particular, the coatings under i) and iii) or ii) and iv) can take place without separate drying as a "wet-on-wet" coating (ref. U.S. Ser. No. 10/183,287BB; WO2019008078A1). Optionally—if the individual coating suspensions are too liquid—warm, dry air (about 50° C.-80° C.; <20% humidity) can be passed through the filter for a short time (usually less than 10, preferably less than 5 seconds) after coating i) or iii). Subsequently, the coating from step ii) or iv) is then immediately applied onto the coating from i) or iii). By eliminating separate drying cycles, the process for producing the filter according to the invention is extremely efficient. Without separate drying, it is extremely preferable to produce filters in which the coatings from steps i) and iii) or ii) and iv) are identical in composition.

The wall-flow filter according to the invention is preferably used to filter the exhaust gas of combustion engines. The filter is preferably used for exhaust gas of gasoline engines. These generally emit relatively small particles, so that good filtration efficiency must be provided. The exhaust gas back pressure should not be increased excessively in the process. For catalytic activity, the wall-flow filter units according to the invention can be combined with further exhaust gas reduction devices, for example selected from the group consisting of three-way catalysts, SCR catalysts, nitrogen oxide storage catalysts, hydrocarbon traps and nitrogen oxide traps. The combination of the wall-flow filter according to the invention and one or two further TWC catalysts on flow-through substrates is very particularly preferred. In this case, either the one or both of the TWC catalysts can be located upstream of the filter according to the invention at a position known to be close to the engine. The filter can also be positioned as a unit close to the engine. However, it is particularly preferred if a TWC catalyst is arranged at a position close to the engine, followed by the filter according to the invention, and then again a TWC catalyst.

The present invention makes it possible to use particularly advantageous wall-flow filters in exhaust systems. However, the fact that these allow such a good balance between catalytic activity, exhaust gas back pressure and filtration efficiency was not known from the background of the known prior art.

FIGURES

FIG. 1 shows a particle filter of the prior art not according to the invention which comprises a wall-flow filter of length L (1) having channels E (2) and channels A (3) that extend in parallel between a first end (4) and a second end (5) of the wall-flow filter and are separated by porous walls (6), which form surfaces OE (7) and OA (8), respectively, and wherein the channels E (2) are closed at the second end (5) and the channels A (3) are closed at the first end (4). A first coating (9) is located in the channels E (2) on the surfaces OE (7) and a second coating (10) is located in the channels A (3) on the surfaces OA (8). This filter is an intermediate product after the first and third coating have been applied.

FIG. 2*a-d* show schematic architectures according to the invention. The layout of FIG. 1 is to be considered in accordance with FIG. 2*a-d*. The same reference signs apply. The sizes of the rectangles (I, II, III, IV) symbolize the respective amounts of coating. Therefore, the embodiments advantageous according to the invention are to be made clear with a corresponding coating ratio between I/II and III/IV.

EXAMPLES

Reference

Figure 1:
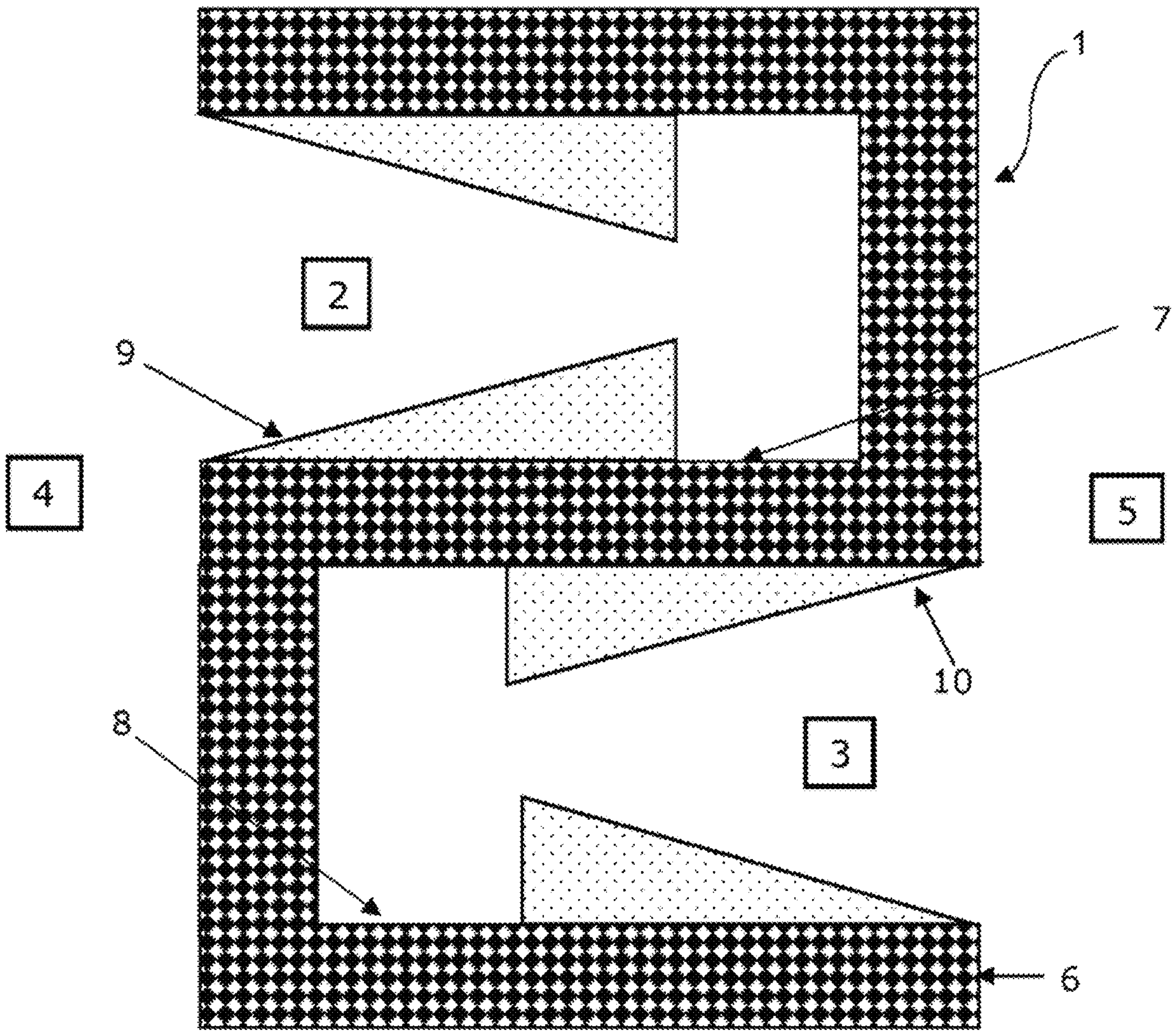
Figure 2A:
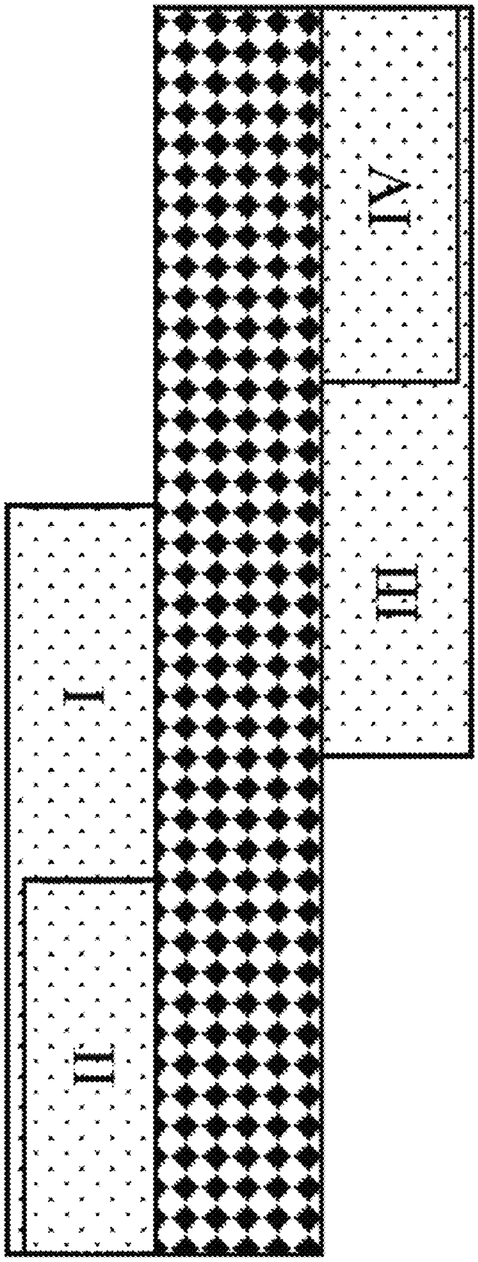
Figure 2B:
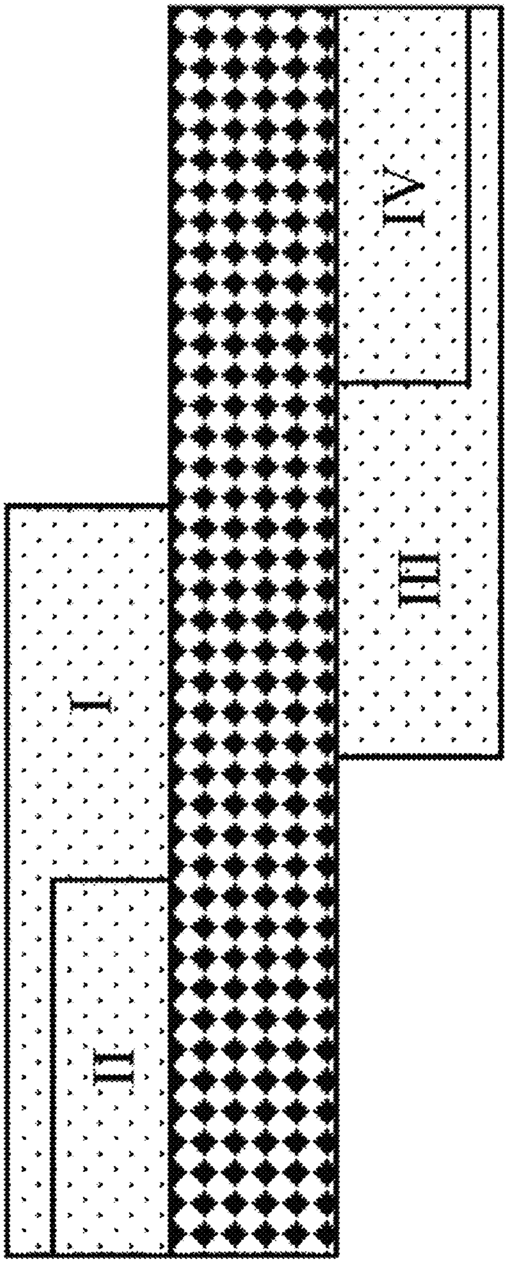
Figure 2C:
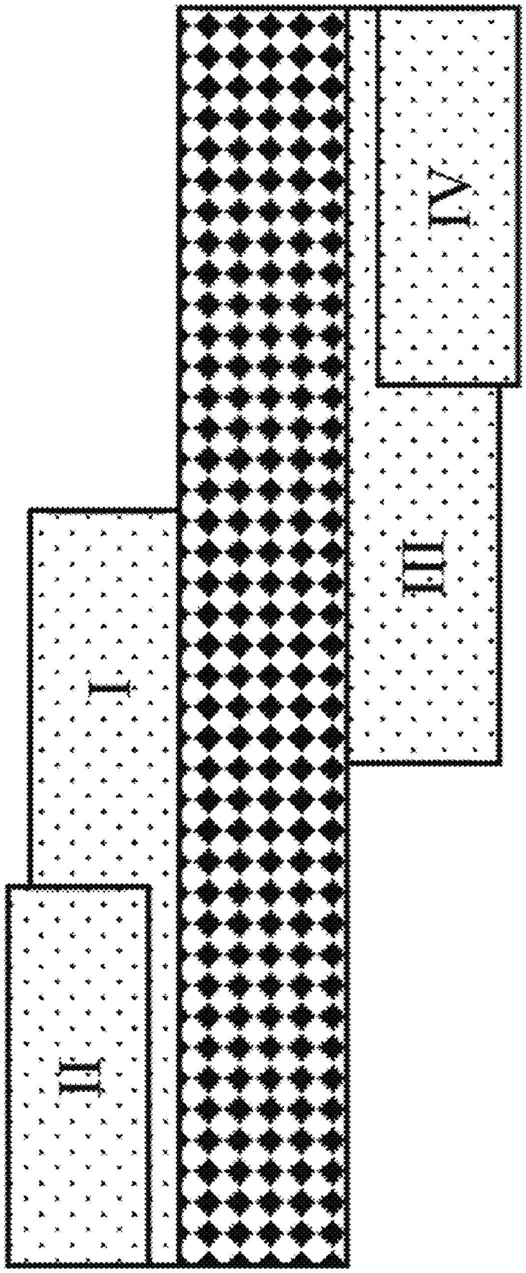
Figure 2D:
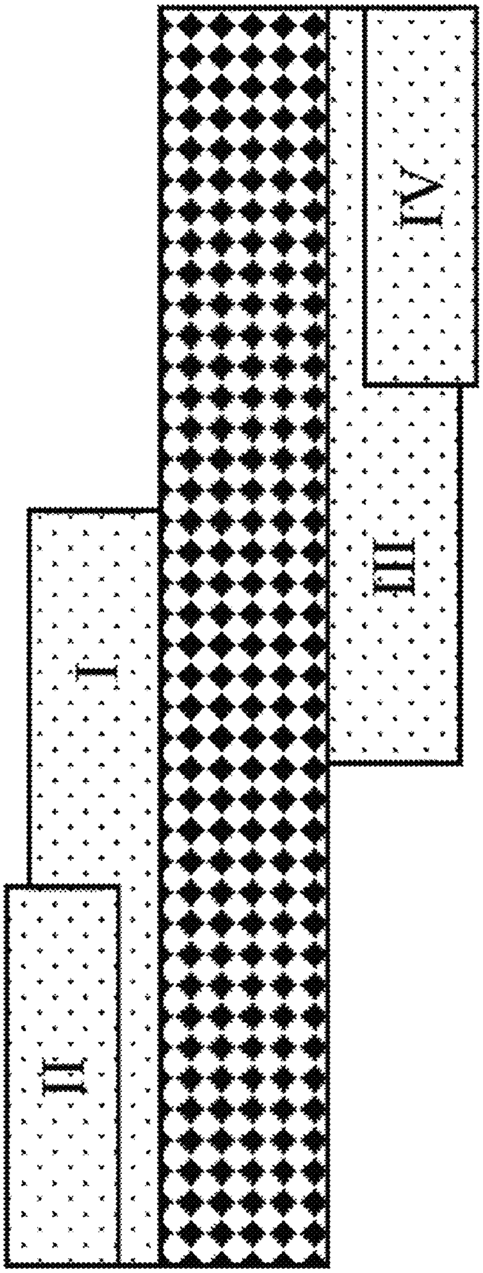

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution and a rhodium nitrate solution under constant stirring. The resulting coating suspension was used directly to coat a commercially available wall flow filter substrate. The coating suspension was coated onto the filter walls of the substrate, first in the input channels to a length of 60% of the filter length. The load of the inlet channel amounted to 83.33 g/l; the precious metal load amounted to 1.06 g/l with a ratio of palladium to rhodium of 5:1. The coated filter thus obtained was dried and then calcined. Then, the output channels of the filter were coated to a length of 60% of the filter length with the same coating suspension. The coated filter thus obtained was dried again and then calcined. The total load of this filter thus amounted to 100 g/l; the total precious metal load amounted to 1.27 g/l with a ratio of palladium to rhodium of 5:1. It is hereinafter referred to as reference.

Example 1

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution and a rhodium nitrate solution under constant stirring. The resulting coating suspension was used directly to coat a commercially available wall flow filter substrate. The coating suspension was coated onto the filter walls of the substrate, first in the input channels to a length of 25% of the filter length (II). The load of this zone amounted to 100 g/l; the precious metal load amounted to 1.27 g/l with a ratio of palladium to rhodium of 5:1. The coated filter thus obtained was dried and then calcined. Then, the output channels of the filter were coated to a length of 25% of the filter length (IV) with the same coating suspension. The coated filter thus obtained was dried again and then calcined. In the third step, the coating suspension was coated in the input channels to a length of 60% of the filter length (l). The load of this zone amounted to 41.67 g/l; the precious metal load amounted to 0.53 g/l with a ratio of palladium to rhodium of 5:1. The coated filter thus obtained was dried and then calcined. In the last step, the output channels of the filter were coated to a length of 60% of the filter length (III) with the same coating suspension. The coated filter thus obtained was dried again and then calcined. The total load of this filter thus amounted to 100 g/l; the total precious metal load amounted to 1.27 g/l with a ratio of palladium to rhodium of 5:1. It is hereinafter referred to as 1.

Example 2

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution and a rhodium nitrate solution under constant stirring. The resulting coating suspension was used directly to coat a commercially available wall flow filter substrate. The coating suspension was coated onto the filter walls of the substrate, first in the input channels to a length of 25% of the filter length (II). The load of this zone amounted to 66.67 g/l; the precious metal load amounted to 0.85 g/l with a ratio of palladium to rhodium of 5:1. The coated filter thus obtained was dried and then calcined. Then, the output channels of the filter were coated to a length of 25% of the filter length (IV) with the same coating suspension. The coated filter thus obtained was dried again and then calcined. In the third step, the coating suspension was coated in the input channels to a length of 60% of the filter length (l). The load of this zone amounted to 55.56 g/l; the precious metal load amounted to 0.71 g/l with a ratio of palladium to rhodium of 5:1. The coated filter thus obtained was dried and then calcined. In the last step, the output channels of the filter were coated to a length of 60% of the filter length (III) with the same coating suspension. The coated filter thus obtained was dried again and then calcined. The total load of this filter thus amounted to 100 g/l; the total precious metal load amounted to 1.27 g/l with a ratio of palladium to rhodium of 5:1. It is hereinafter referred to as 2.

Example 3

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution and a rhodium nitrate solution under constant stirring. The resulting coating suspension was used directly to coat a commercially available wall flow filter substrate. The coating suspension was coated onto the filter walls of the substrate, first in the input channels to a length of 60% of the filter length (l). The load of this zone amounted to 41.67 g/l; the precious metal load amounted to 0.53 g/l with a ratio of palladium to rhodium of 5:1. The coated filter thus obtained was dried and then calcined. Then, the output channels of the filter were coated to a length of 60% of the filter length (III) with the same coating suspension. The coated filter thus obtained was dried again and then calcined. In the third step, the coating suspension was coated in the input channels to a length of 25% of the filter length (II). The load of this zone amounted to 100 g/l; the precious metal load amounted to 1.27 g/l with a ratio of palladium to rhodium of 5:1. The coated filter thus obtained was dried and then calcined. In the last step, the output channels of the filter were coated to a length of 25% of the filter length (IV) with the same coating suspension. The coated filter thus obtained was dried again and then calcined. The total load of this filter thus amounted to 100 g/l; the total precious metal load amounted to 1.27 g/l with a ratio of palladium to rhodium of 5:1. It is hereinafter referred to as 3.

Example 4

Aluminum oxide stabilized with lanthanum oxide was suspended in water with a first oxygen storage component, which comprised 40% by weight cerium oxide, zirconium oxide, lanthanum oxide and praseodymium oxide, and a second oxygen storage component, which comprised 24% by weight cerium oxide, zirconium oxide, lanthanum oxide and yttrium oxide. Both oxygen storage components were used in equal parts. The weight ratio of aluminum oxide and oxygen storage component was 30:70. The suspension thus obtained was subsequently mixed with a palladium nitrate solution and a rhodium nitrate solution under constant stirring. The resulting coating suspension was used directly to coat a commercially available wall flow filter substrate. The coating suspension was coated onto the filter walls of the substrate, first in the input channels to a length of 60% of the filter length (l). The load of this zone amounted to 55.56 g/l; the precious metal load amounted to 0.71 g/l with a ratio of palladium to rhodium of 5:1. The coated filter thus obtained was dried and then calcined. Then, the output channels of the filter were coated to a length of 60% of the filter length (III) with the same coating suspension. The coated filter thus obtained was dried again and then calcined. In the third step, the coating suspension was in the input channels to a length of 25% of the filter length (II). The load of this zone amounted to 66.67 g/l; the precious metal load amounted to 0.85 g/l with a ratio of palladium to rhodium of 5:1. The coated filter thus obtained was dried and then calcined. In the last step, the output channels of the filter were coated to a length of 25% of the filter length (IV) with the same coating suspension. The coated filter thus obtained was dried again and then calcined. The total load of this filter thus amounted to 100 g/l; the total precious metal load amounted to 1.27 g/l with a ratio of palladium to rhodium of 5:1. It is hereinafter referred to as 4.

Catalytic Characterization

Figure 3:
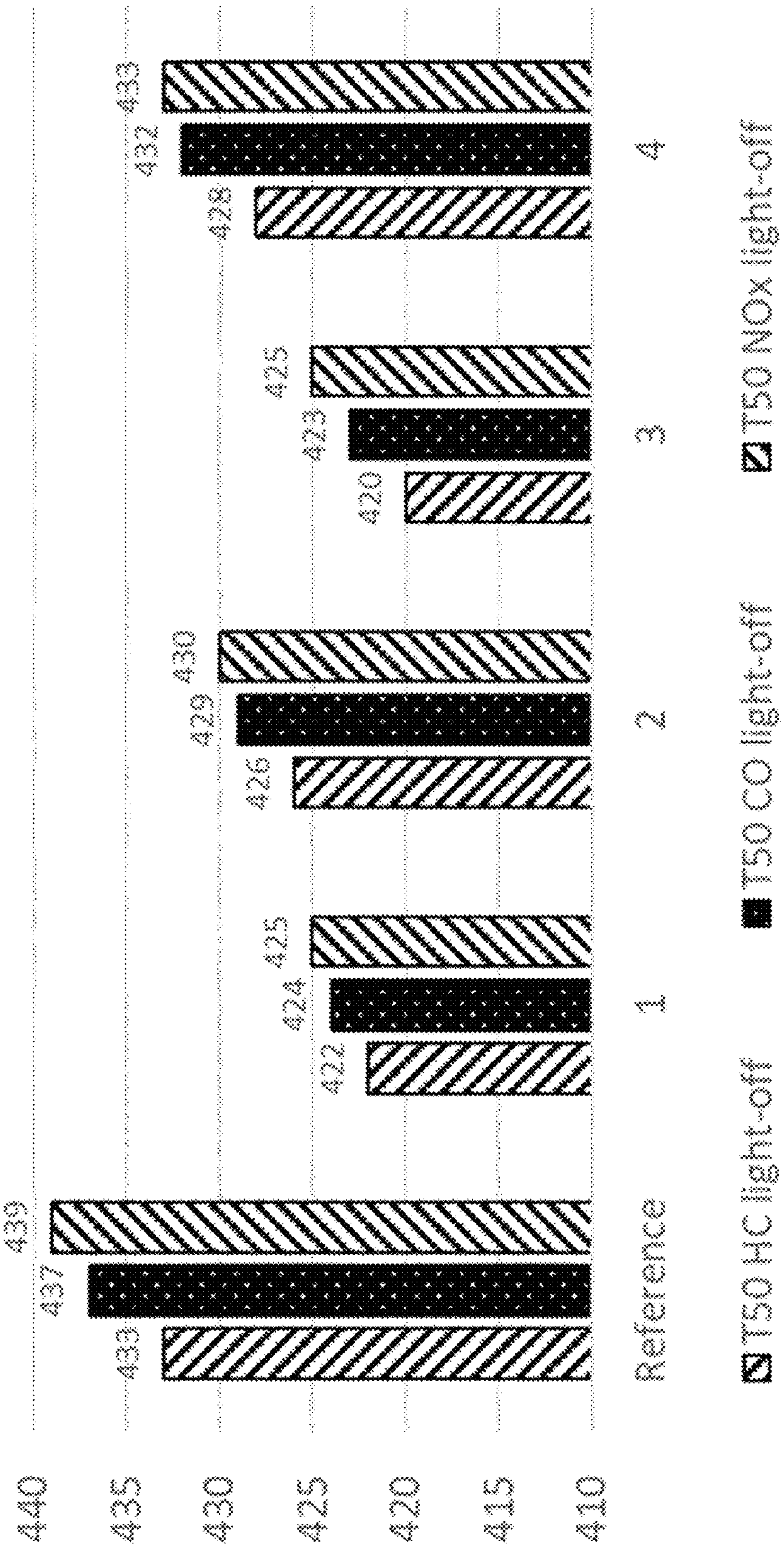
FIG. 3 shows the improved catalytic activity of the embodiments according to the invention of FIG. 2*a*=[1]; 2*b*=[2]; 2*c*=[3]; 2*d*=[4] in comparison to the reference according to FIG. 1.

All five particle filters were aged together in an engine test bench aging process. This aging process consists of an overrun cut-off aging process with an exhaust gas temperature of 950° C. before the catalyst inlet (maximum bed temperature of 1030° C.). The aging time was 38 hours (see *Motortechnische Zeitschrift,* 1994, 55, 214-218). The catalytically active particle filters were then tested in the aged state on an engine test bench in the so-called "light-off test." In the light-off test, the light-off behavior is determined in the case of a stoichiometric exhaust gas composition with a constant average air ratio λ (λ=0.999 with ±3.4% amplitude). The results are shown in FIG. 3. The particle filters 1-4 and in particular 1 and 3 according to the invention show a significant improvement in light-off behavior compared to the reference.

Physical Characterization

Figure 4:
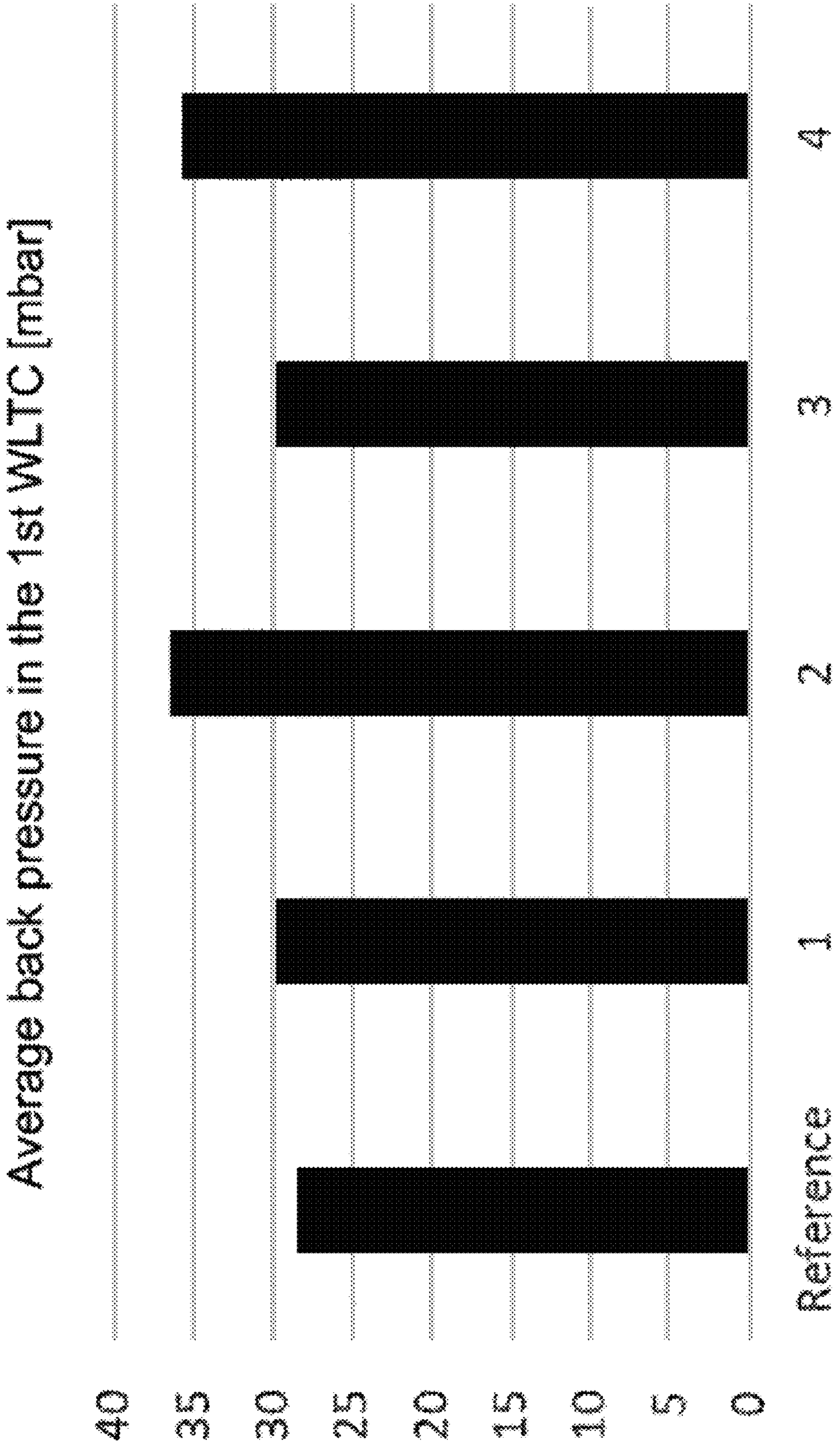
FIG. 4 shows the exhaust gas back pressure of the embodiments of FIG. 2*a*=[1]; 2*b*=[2]; 2*c*=[3]; 2*d*=[4] in comparison to the reference according to FIG. 1.
Figure 5:
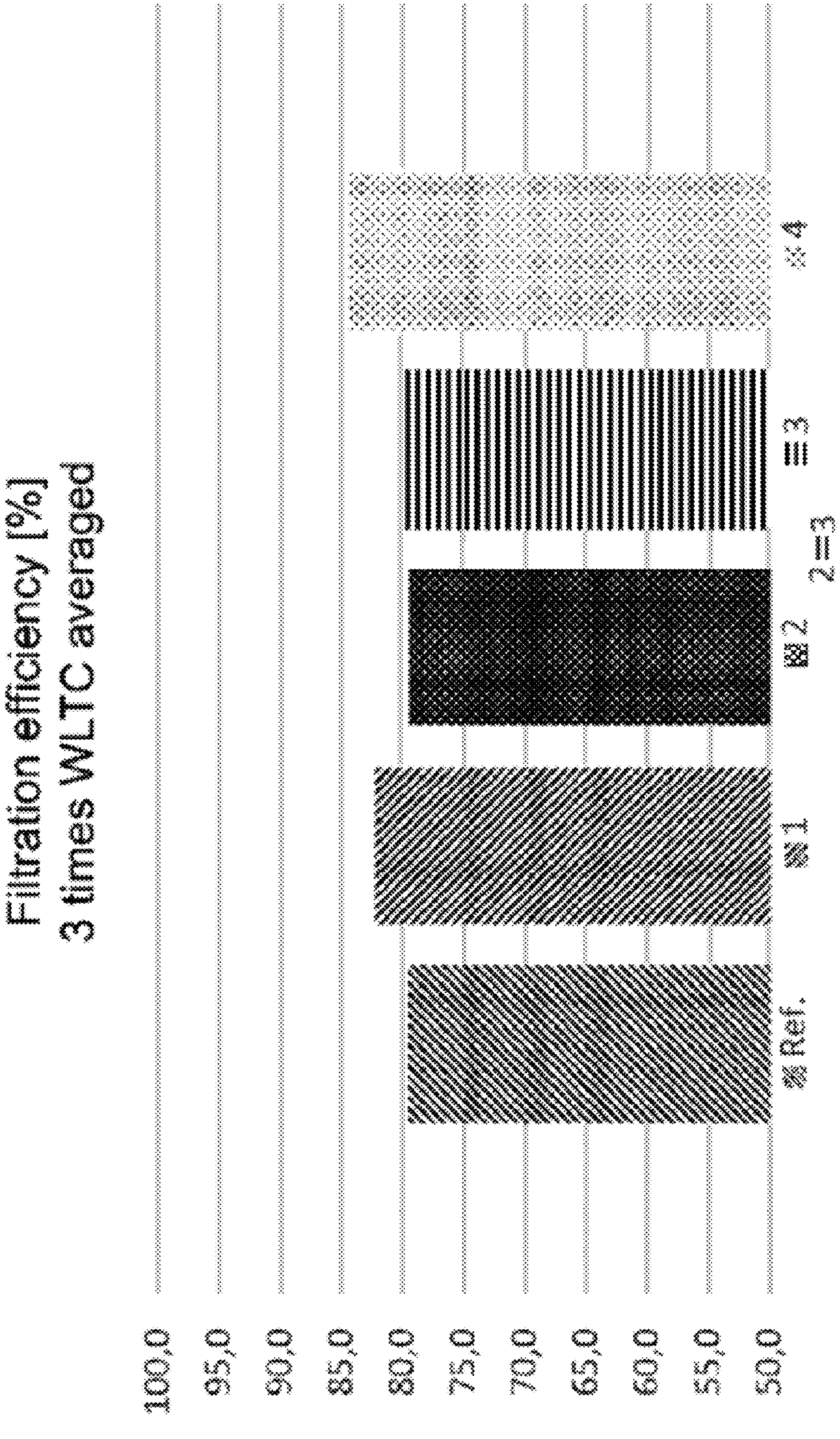
FIG. 5 shows the filtration efficiency of the embodiments according to the invention of FIG. 2*a*=[1]; 2*b*=[2]; 2*c*=[3]; 2*d*=[4] in comparison to the reference according to FIG. 1.
Figure 6:
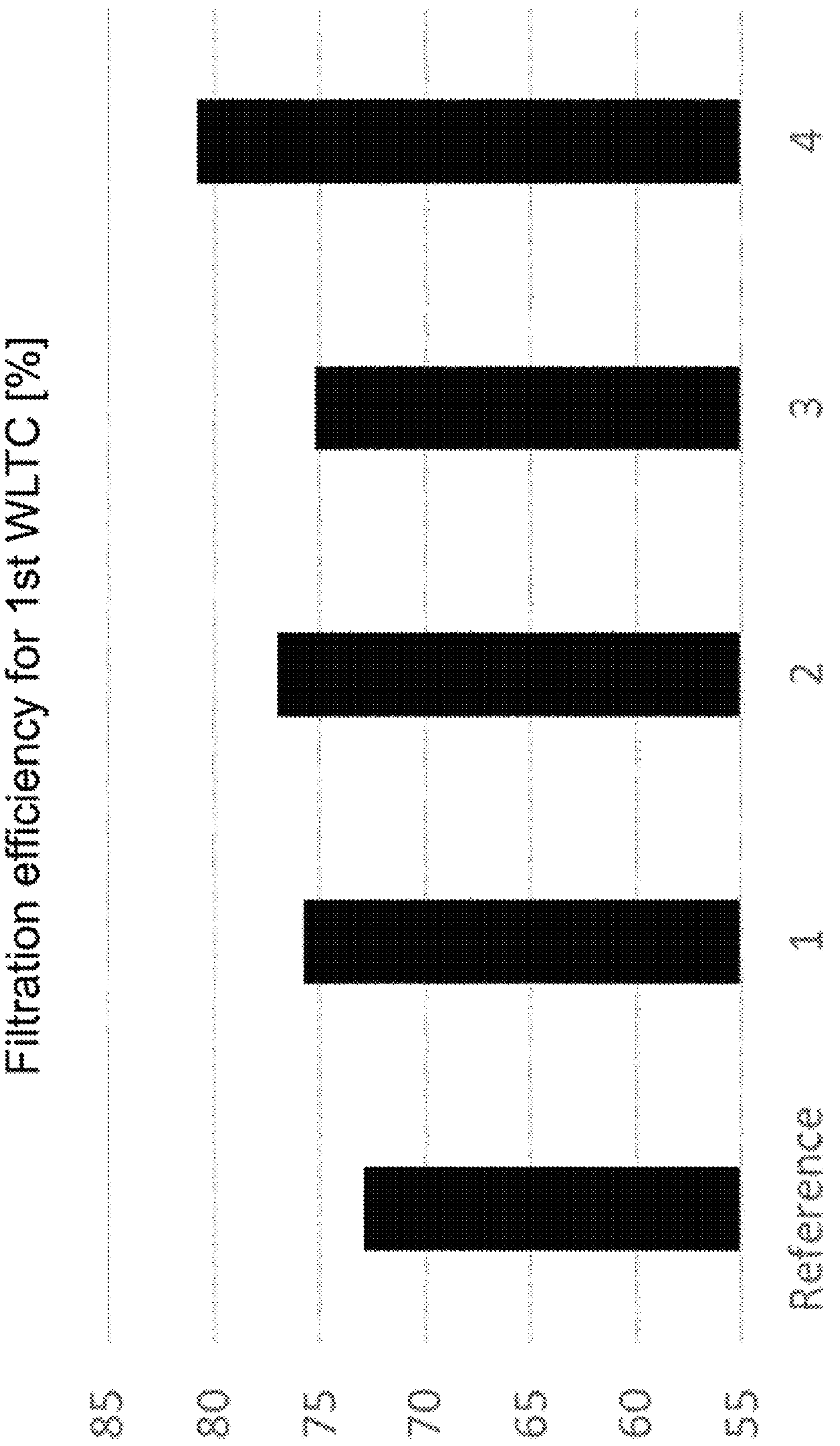
FIG. 6 shows the filtration efficiency in a first WLTC cycle of the embodiments according to the invention of FIG. 2*a* =[1]; 2*b* =[2]; 2*c* =[3]; 2*d* =[4] in comparison to the reference according to FIG. 1.

All five particle filters were compared with respect to the exhaust gas back pressure on the engine test bench. The average exhaust gas back pressure in a WLTC driving cycle is shown in FIG. 4. As expected, the changed distribution of the coating suspension results in a slight increase in back pressure compared to the reference. In addition, all five particle filters were tested on the engine test bench for filtration efficiency in WLTC driving cycles. FIG. 6 shows the filtration efficiency in the first WLTC cycle. Filtration efficiency was improved for all particle filters 1-4 according to the invention compared to the reference, particularly for 2 and 4.

The invention claimed is:

1. A wall-flow filter for reducing particle emissions in the exhaust gas of gasoline engines having the length L, wherein the wall-flow filter comprises channels E and A that extend in parallel between a first and a second end of the wall-flow filter and are separated by porous walls forming surfaces OE and OA, respectively, and wherein the channels E are closed at the second end and the channels A are closed at the first end, wherein said wall-flow filter has two catalytically active coatings applied to the surfaces OE and OA in separate coating steps, wherein a first coating extends from the first end of the wall-flow filter over 55 to 96% of the length L and a second coating extends from the first end of the wall-flow filter over 10 to 40% of the length L and wherein a third coating extends from the second end of the wall-flow filter over 55 to 96% of the length L and a fourth coating extends from the second end of the wall-flow filter over 10 to 40% of the length L.

2. The wall-flow filter according to claim 1, wherein a first coating extends from the first end of the wall-flow filter over 55 to 80% of the length L and a second coating extends from the first end of the wall-flow filter over 20 to 40% of the length L and wherein a third coating extends from the second end of the wall-flow filter over 55 to 80% of the length L and a fourth coating extends from the second end of the wall-flow filter over 20 to 40% of the length L.

3. The wall-flow filter according to claim 1, wherein the ratio of the amount of catalytically active coating in g/l between the first coating and the second coating or between the third and fourth coating is less than or equal to 1:1 and greater than or equal to 1:3.

4. The wall-flow filter according to claim 1, wherein the coatings on the surface OE and OA are different in each case.

5. The wall-flow filter according to claim 1, wherein the first coating and the third coating are applied to the wall-flow filter before the second and the fourth coating are applied.

6. The wall-flow filter according to claim 1, wherein at least one of the coatings 1-4 contains stabilized aluminum oxide in an amount from 20 to 70% by weight based on the total weight of the coating, rhodium, palladium or palladium and rhodium and one or more oxygen storage components in an amount from 30 to 80% by weight based on the total weight of the respective coating.

7. A method for producing a wall-flow filter according to claim 1, comprising i) a first coating suspension is introduced in excess via the first end by applying a pressure difference into the wall-flow filter via the vertically locked wall-flow filter, and a pressure difference reversal removes an excess of the first coating suspension from the wall-flow filter;

ii) a third coating suspension is introduced in excess via the second end by applying a pressure difference into the wall-flow filter via the vertically locked wall-flow filter, and a pressure difference reversal removes an excess of the third coating suspension from the wall-flow filter;

iii) a second coating suspension is introduced into the wall-flow filter via the first end by applying a pressure difference across the vertically locked wall-flow filter;

iv) a fourth coating suspension is introduced into the wall-flow filter via the second end by applying a pressure difference across the vertically locked wall-flow filter.

8. The method according to claim 7, wherein the coating suspensions in steps iii) and iv) are introduced into the wall-flow filter without an excess of coating suspension.

9. The method according to claim 7, wherein no separate drying of the wall-flow filter takes place between the coating steps.

10. A method of exhaust filtration, comprising utilizing a wall-flow filter according to claim 1 in an exhaust gas system for gasoline engine exhaust gases.

11. The method according to claim 10, wherein exhaust gas reduction units selected from the group consisting of three-way catalysts, SCR catalysts, nitrogen oxide storage catalysts, hydrocarbon traps, nitrogen oxide traps are present as further exhaust gas reduction units in the exhaust gas system.

* * * * *